US 12,097,752 B2

United States Patent
Gaiser

(10) Patent No.: US 12,097,752 B2
(45) Date of Patent: Sep. 24, 2024

(54) HEATING SYSTEM FOR A VEHICLE AND PROCESS FOR HEATING A VEHICLE

(71) Applicant: Purem GmbH, Neunkirchen (DE)

(72) Inventor: Gerd Gaiser, Reutlingen (DE)

(73) Assignee: PUREM GMBH, Neunkirchen (DE)

( * ) Notice: Subject to any disclaimer, the term of this patent is extended or adjusted under 35 U.S.C. 154(b) by 177 days.

(21) Appl. No.: 16/676,723

(22) Filed: Nov. 7, 2019

(65) Prior Publication Data

US 2020/0148036 A1    May 14, 2020

(30) Foreign Application Priority Data

Nov. 8, 2018  (DE) .................... 10 2018 127 861.6

(51) Int. Cl.
  *B60H 1/22*    (2006.01)
  *B01J 4/00*    (2006.01)
  *B60N 2/56*    (2006.01)

(52) U.S. Cl.
  CPC ............... *B60H 1/22* (2013.01); *B01J 4/008* (2013.01); *B60N 2/56* (2013.01); *B01J 2219/00074* (2013.01)

(58) Field of Classification Search
  CPC ................................. B60H 1/22; F25B 17/00
  See application file for complete search history.

(56) References Cited

U.S. PATENT DOCUMENTS

| 4,736,596 A | * | 4/1988 | Iguchi | F25B 17/12 62/238.7 |
| 5,518,069 A | * | 5/1996 | Maier-Laxhuber | F28D 20/003 165/104.12 |
| 6,123,569 A | * | 9/2000 | Fukushima | B60L 53/65 439/456 |

(Continued)

FOREIGN PATENT DOCUMENTS

| DE | 4126960 A1 | 2/1993 |
| DE | 43 10836 A1 | 10/1994 |

(Continued)

OTHER PUBLICATIONS

JP 2012007822 A mt (Year: 2012).*

(Continued)

*Primary Examiner* — Gordon A Jones
(74) *Attorney, Agent, or Firm* — McGlew and Tuttle, P.C.

(57) ABSTRACT

A heating system for a vehicle includes a reaction space (16) containing a first reactant (22) and a reactant storage space (20) containing or/and receiving a second reactant (24), wherein the first reactant and the second reactant form such a reaction system. A reaction of the first reactant with the second reactant produces a reaction product that releases heat. The second reactant can be separated from the first reactant by introducing heat into the reaction product. A reactant-releasing device (26) releases second reactant from the reactant storage space into the reaction space (16). A first heat removal device (58) removes heat from the first reactant or/and reaction product contained in the reaction space (16).

(Continued)

A heating unit (52) heats the first reactant or/and heats the reaction product contained in the reaction space. A reactant-recirculating device (36) recirculates second reactant from the reaction space into the reactant storage space.

10 Claims, 1 Drawing Sheet

(56) References Cited

U.S. PATENT DOCUMENTS

| | | | |
|---|---|---|---|
| 10,139,169 B2 * | 11/2018 | Nam | F25B 17/08 |
| 10,502,111 B2 * | 12/2019 | Gaiser | F01N 3/208 |
| 2013/0192281 A1 * | 8/2013 | Nam | F25B 17/08 |
| | | | 62/476 |
| 2018/0106508 A1 * | 4/2018 | Bolin | B01J 20/045 |

FOREIGN PATENT DOCUMENTS

| | | |
|---|---|---|
| DE | 102012006311 A1 | 10/2013 |
| DE | 10 2015 010003 A1 | 2/2017 |
| JP | 2012007822 A * | 1/2012 |
| WO | WO-2013059785 A1 * | 4/2013 ............ B01J 20/205 |
| WO | 2013/167834 A2 | 11/2013 |

OTHER PUBLICATIONS

Dorian Marxa, Lisa Jossa, Max Heftia, Ronny Pinib;The Role of Water in Adsorption-based CO2 Capture Systems (Year: 2013).*
FR3082784A1 mt and FOR (Year: 2019).*

* cited by examiner

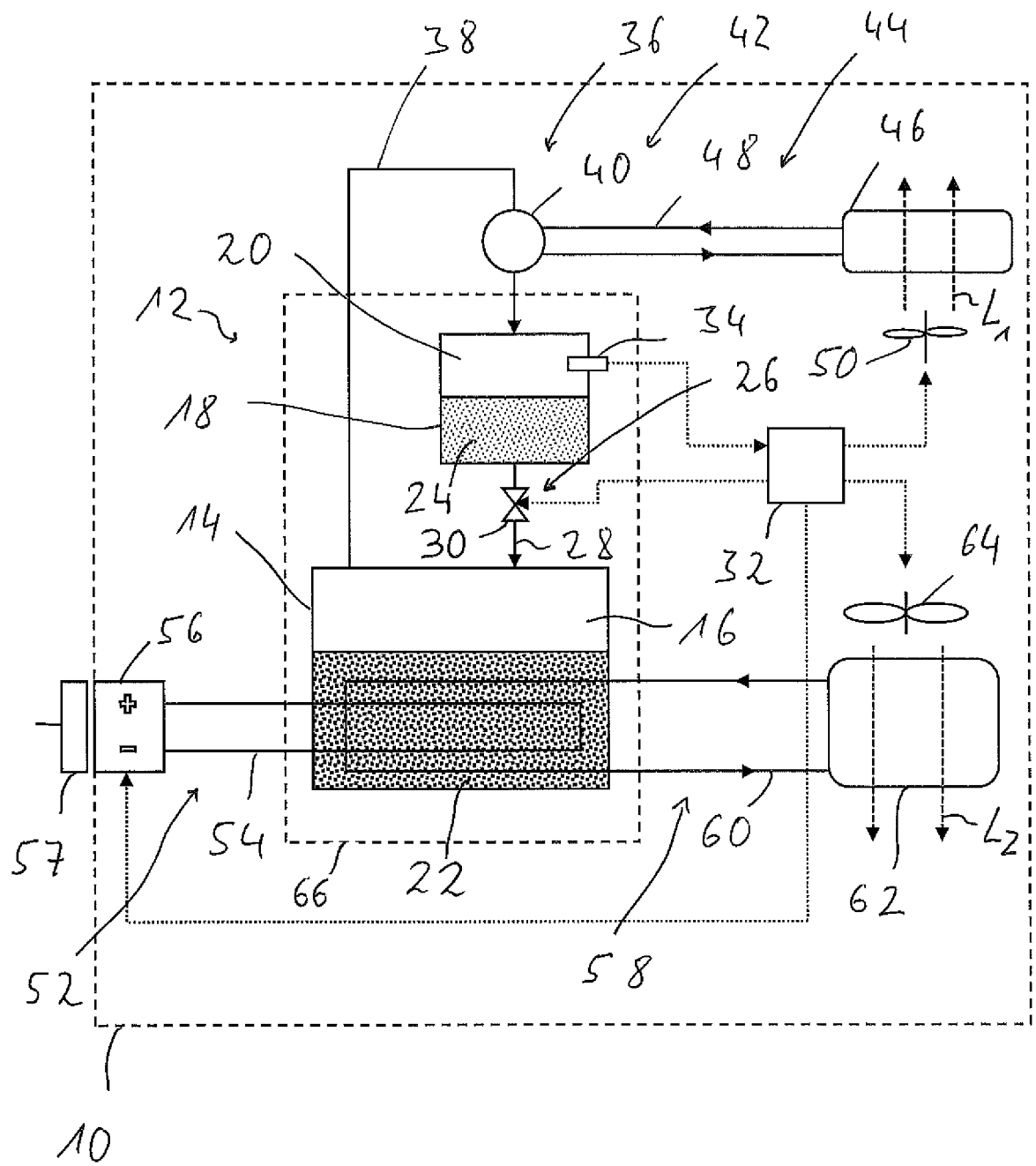

HEATING SYSTEM FOR A VEHICLE AND PROCESS FOR HEATING A VEHICLE

CROSS REFERENCE TO RELATED APPLICATIONS

This application claims the benefit of priority under 35 U.S.C. § 119 of German Application 10 2018 127 861.6, filed Nov. 8, 2018, the entire contents of which are incorporated herein by reference.

TECHNICAL FIELD

The present invention pertains to a heating system for a vehicle as well as to a process for heating a vehicle, especially an electrically operated vehicle.

TECHNICAL BACKGROUND

It is basically impossible above all in electrically operated vehicles to utilize the waste heat generated in a drive assembly to heat different system areas of the vehicle, for example, the interior of the vehicle. To achieve sufficient heating in such vehicles as well, it is known, for example, to use electrical heating devices, for example, PTC heaters. These are supplied during the operation of the vehicle from a battery present in the vehicle, which also provides basically the electrical energy necessary for the vehicle operation. The load on such a battery due to heating devices to be supplied with electrical energy for heating a vehicle represents an additional load, which reduces the energy available for the vehicle operation and may lead to a substantial reduction of the range of electrically operated vehicles especially at comparatively low ambient temperatures.

SUMMARY

An object of the present invention is to provide a heating system for a vehicle as well as a process for heating a vehicle, with which heating system and process sufficient heating of the vehicle can be achieved in a reliable manner without loading a source of electrical energy present in the vehicle.

According to a first aspect of the present invention, this object is accomplished by a heating system for a vehicle, comprising:
a reaction space containing a first reactant,
a reactant storage space containing or/and receiving a second reactant, wherein the first reactant and the second reactant form such a reaction system that a reaction of the first reactant with the second reactant releases heat for producing a reaction product and the second reactant can be separated from the first reactant by introducing heat into the reaction product,
a reactant-releasing device for releasing the second reactant from the reactant storage space into the reaction space,
a first heat removal device for removing heat from the first reactant or/and reaction product contained in the reaction space,
a heating unit for heating the first reactant or/and reaction product contained in the reaction space, and
a reactant-recirculating device for recirculating the second reactant from the reaction space into the reactant storage space.

The heating system according to the present invention utilizes a cyclically repeatable process of the reaction of two reactants with one another and of the separation of the two reactants contained in a reaction product from one another to provide the heat necessary for heating a vehicle. Heat, which can be used during the operation of a vehicle, for example, to heat the air to be introduced into the interior of the vehicle, is released during the reaction of the two reactants, which is brought about during the vehicle operation to produce the reaction product. The separation of the two reactants contained in the reaction product from one another, for example, by splitting the reaction product to recover the two reactants by introducing heat, can be carried out when a vehicle equipped with a heating system according to the present invention is not in operation, for example, during a phase during which the battery providing a source of electrical energy is being recharged.

In order to make it possible to achieve a defined release of a first reactant into the reaction space to provide the necessary thermal energy, the reactant-releasing device may comprise a reactant-releasing line and a valve assembly for optionally establishing and interrupting, in particular selectively establishing and interrupting a reactant-releasing connection between the reactant storage space and the reaction space. By actuating the valve assembly, it is thus possible to set the quantity of the first reactant released into the reaction space and thus also the amount of heat released during the reaction taking place in the reaction space.

To provide the second reactant in a state of aggregation suitable for storage in the reactant storage space, on the one hand, and to carry out the reaction with the first reactant, on the other hand, it is proposed that the reactant-recirculating device comprise a reactant-recirculating line and a condenser device for receiving reactant discharged from the reaction space as a gas and for feeding liquid second reactant into the reactant storage space.

The heat can be removed from the first reactant discharged as a gas due to heating in the reaction space, for example, by the condenser device comprising a second heat removal device for removing heat from the second reactant received in a condenser.

The heating unit preferably comprises an electrically energizable heat conductor device. To supply this with electrical energy, provisions may be made for the heating unit to comprise a connection unit for connecting the heating unit to a voltage source that is an external source in relation to the vehicle. A line voltage system present at a vehicle parking space in a garage may advantageously be used as an energy source that is external in relation to the vehicle. It is thus possible, whenever an electrically operated vehicle is connected to such a line voltage system in order to charge the battery or possibly a plurality of batteries provided in the vehicle, to also operate at the same time the line voltage system used as an external voltage source in order to separate the first reactant from the second reactant by heating the reaction product present in the reaction space and to store it in the reactant storage space for a heating operation to be carried out during a heating phase.

The first heat removal device may comprise for the removal of the heat generated during the reaction of the first reactant with the second reactant a heat carrier medium circuit with a heat exchanger device for transferring heat being transported in the heat carrier medium circulating in the heat carrier medium circuit to a medium to be heated. The heat carrier medium can thus flow, for example, through the reaction space in the heat carrier medium circuit passing through this reaction space and absorb heat in the process from the reaction product or the first reactant surrounding the heat carrier medium circuit.

The reaction system may comprise second reactant reacting chemically with the first reactant.

Provisions may be made, for example, for the first reactant to be or contain calcium oxide and for the second reactant to be or contain water.

In an alternative embodiment, the reaction system may comprise a second reactant reacting thermophysically with the first reactant, preferably a second reactant adsorbable by the first reactant.

Provisions may be made in this alternative embodiment, for example, for the first reactant to be or contain zeolite and for the second reactant to be or contain water.

According to another aspect, the object described in the introduction is accomplished by a process for providing heat for heating a vehicle, comprising the following steps:

a) Introduction, in a heating phase, of a second reactant into a first reactant contained in a reaction space to produce a reaction product by a reaction of the first reactant with the second reactant, the first reactant and the second reactant forming such a reaction system that a reaction of the first reactant with the second reactant for producing the reaction product releases heat and the second reactant can be separated from the first reactant by introducing heat into the reaction product, and b) heating, in a preheating phase, of the reaction product contained in the reaction space and removal of second reactant released by the heating of the reaction product from the reaction space.

The second reactant can be released in step a) from a reactant storage space containing the second reactant into the reaction space.

Further, heat provided in the reaction space by the reaction of the first reactant with the second reactant can be absorbed and removed in step a) in a heat carrier medium flowing through or/and around the reaction space.

The reaction product contained in the reaction space can be heated in step b) by an electrically energizable heat conductor device.

Loading of the energy source present in a vehicle can be avoided according to an especially advantageous aspect of the present invention by energy being provided in step b) for heating the reaction product contained in the reaction space by an energy source that is external in relation to the vehicle, preferably by a line voltage system.

The two reactants may provide such a reaction system that the first reactant reacts chemically with the second reactant in step a).

Provisions may be made for this, for example, for the first reactant to be or contain calcium oxide and for the second reactant to be or contain water.

In an alternative embodiment, the two reactants may provide such a reaction system that the first reactant reacts with the second reactant thermophysically in step a) and the first reactant is preferably adsorbed by the first reactant.

Provisions may be made in this case, for example, for the first reactant to be or contain zeolite and for the second reactant to be or contain water.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view showing the configuration of a vehicle equipped with a heating system.

DESCRIPTION OF PREFERRED EMBODIMENTS

Referring to the drawings, a heating system provided in a vehicle 10 shown schematically is designated by 12 in FIG. 1. The heating system 12 comprises as essential components a reaction container 14 with a reaction space 16 formed therein as well as a reactant storage container 18 with a reactant storage space 20 formed therein.

A first reactant 22, which will be explained in even more detail below, is provided in the reaction container 14 or in the reaction space 16 formed therein, for example, in the solid state of aggregation. The first reactant 22 may be present, for example, in the powdered or granular form and distributed essentially loosely in the reaction space 16. The reaction space 16 may also be divided, for example, into a plurality of volume areas, which are separated from one another and contain each portions of the first reactant 22, for example, by elastically deformable separation elements.

A second reactant 24 is received in the liquid state of aggregation in the reactant storage container 18 or in the reactant storage space 20. Liquid second reactant 24 can be drawn off from the reactant storage space 20 into the reaction space 16 through a reactant-releasing device generally designated by 26. The reactant-releasing device 26 comprises in the example shown a reactant-releasing line 28 as well as a valve assembly 30, which is provided in the reactant-releasing line 28 and which may comprise, for example, a solenoid valve. The valve assembly 30 is actuated by an actuating device generally designated by 32. By generating corresponding actuating commands, the reactant-releasing line 28 can be released for establishing a connection between the reactant storage space 20 and the reaction space 16 and blocked for interrupting this connection. The valve assembly 30 can preferably also be actuated such that the quantity of the second reactant 24 released into the reaction space 16 from the reactant storage space 20 per unit of time can be set. A filling level sensor 34 can send information on the filling level of the second reactant 24 in the reactant storage space 20 to the actuating device 32, so that information on the quantity of the second reactant 24 present in the reactant storage space 20 is basically present in the actuating device 32.

Further, the reaction space 16 and the reactant storage space 20 are in connection with one another via a reactant-recirculating device 36. The reactant-recirculating device 36 comprises a reactant-recirculating line 38, which leads from the reaction space 16 to a condenser 40 of a condenser device generally designated by 42. The condenser device 42 further comprises a heat removal device 44 with a heat exchanger 46 and with a heat carrier medium circuit 48 passing through the condenser 40, on the one hand, and through the heat exchanger 46, on the other hand.

Gaseous second reactant 24 sent from the reaction space 16 via the reactant-recirculating line 38 into the condenser 40 releases heat to the generally liquid heat carrier medium circulating in the heat carrier medium circuit 48 due, for example, to the delivery action of a pump, in the area of the condenser 40. This heat carrier medium releases the heat in the area of the heat exchanger 46, for example, to air L1 being delivered by a blower 50 via the heat exchanger 46, so that the gaseous second reactant 24 is cooled in the condenser 40, condenses, and accumulates in the reactant storage space 20 in the liquid form. The blower 50 may now be actuated by the actuating device 32 in order to make it possible to ensure, by operating the blower 50, whenever gaseous second reactant 24 is released from the reaction space 16 in a preheating phase described below and cooling is therefore necessary in the area of the condenser 40, that the heat carrier medium circulating in the heat carrier medium circuit 48 can release the heat absorbed in the condenser 40 to the air L1 via the heat exchanger 46.

A heating unit generally designated by 52 is associated with the first reactant 22 arranged in the reaction space 16. The heating unit 52 comprises a heat conductor device 54, which can be heated by electrical energization, and which passes through the reaction space 16 and the first reactant 22 contained therein such that an approximately uniform heating thereof can take place over the volume of the first reactant 22. The heat conductor device 54 may pass through the reaction space 16 and the first reactant 22 such that it is wound a plurality of times or/and extends in different planes.

The heating unit 52 further comprises a connection unit 56, with which the heat conductor device 52 can be connected to a voltage source 57, which is external in relation to the vehicle, for example, to a line voltage system provided in a building or at a parking space. The connection unit 56 may be integrated or provided by a connection unit provided for charging a vehicle battery on a vehicle. This means that whenever a vehicle is connected with such a connection unit 56 to a line voltage system, generally consequently to the voltage source 57, which is external in relation to the vehicle, the heat conductor device 54 can also be energized in order to heat in this manner in the reaction space 16 the first reactant 22 present in the reaction space 16 or/and a reaction product formed during the reaction of the first reactant 22 and the second reactant 24 such that the reaction product is split and the second reactant 24 is hence separated from the first reactant 22, it is discharged from this reaction space in the gaseous state of aggregation and leaves the reaction space 16 via the reactant-recirculating line 38 in the direction of the condenser 40.

Further, a heat removal device, generally designated by 58, is associated with the reaction container 14. This heat removal device 58 comprises a heat carrier medium circuit 60, in which a generally liquid heat carrier medium, delivered, for example, by a pump, circulates and flows in the process into the area of the heat carrier medium circuit 60, which area extends in the interior of the reaction space 16, into the reaction space 16 and into the first reactant 22 or/and into reaction product contained therein. The heat carrier medium circulating in the heat carrier medium circuit 60 can absorb heat in the area of the reaction space 16 and transport same to a heat exchanger 62. Air L2, which is delivered by a blower 64 and is to be introduced, for example, into the interior of a vehicle, absorbs heat in the area of the heat exchanger 62 from the heat carrier medium circulating in the heat carrier medium circuit 60 and consequently transports this into the area of a vehicle, which area is to be heated. The blower 64 may also be actuated by the actuating device 32.

A heat-insulated outer housing 66 receiving the reaction container 14 and the reactant storage container 18 may be provided in order to avoid heat losses to the outside and especially also to protect the second reactant 24 present in the reactant storage space 20 in the liquid form from low ambient temperatures both during the reaction of the two reactants 22, 24 for producing the reaction product while heat is released and also during the energization of the heat conductor device 54 for separating the two reactants 22, 24 from one another.

The mode of operation of the heating system 12 will be described below on the basis of an example for a reaction system, which comprises calcium oxide (CaO) as the first reactant 22 and water ($H_2O$) as the second reactant 24. This reaction system consequently provides a reaction system in which the reaction between the first reactant and the second reactant is a chemical reaction.

Based on an operating state in which, for example, a majority of the entire amount of second reactant 24, i.e., liquid water, which is present in the heating system 12, is contained in the reactant storage space 20, the valve assembly 30 can be actuated by the actuating device 32 for releasing the connection of the reactant storage space 20 to the reaction space 16 and hence for releasing a defined quantity of the liquid second reactant 24 into the reaction space 16, for example, during the operation of the vehicle 10 when heating of the interior space of the vehicle is necessary. If the liquid second reactant 24, i.e., water, enters the first reaction space 16, it reacts with the first reactant 22 contained in it, i.e., calcium oxide, to form calcium hydroxide (CaOH). Heat is released during this reaction, and this heat is absorbed in the area of the heat carrier medium circuit 60, which area extends in the reaction space 16, and in the heat carrier medium circulating in same and the heat can be delivered to the heat exchanger 62. If the blower 64 is also put into operation by the actuating device 32, the air L2 to be introduced into the interior of the vehicle flows through the heat exchanger 62, it absorbs heat and can thus be introduced in the heated state into the interior of the vehicle. This process, generally called heating phase, can be continued as long as the liquid water providing the second reactant 24 is present in the reactant storage space 20. The quantity of the available second reactant 24, i.e., water in this case, is selected to be such that second reactant 24 is available for being introduced into the reaction space 16 for the duration of the time during which the vehicle 10 can also be operated by means of an electric motor.

After the reaction carried out in the reaction space 16, when reaction product, i.e., calcium hydroxide in this case, which was produced in the reaction space 16, is present, the reaction product, i.e., calcium hydroxide, which is present in the reaction space 16, can be split by electrical energization of the heat conductor system 54 by heating to a temperature in the range of about 600° C. during a phase during which the vehicle 10 is connected to a line voltage system for charging a vehicle battery, so that the reaction product is split and the second reactant 24, i.e., water in this case, separated from the first reactant 22, i.e., calcium oxide, is provided and it enters the reactant-recirculating line 38 and the condenser 40 in the gaseous state of aggregation because of the comparatively high temperature. The actuating device 32 can then actuate the blower 50 during this preheating phase in order to ensure sufficient cooling of the second reactant 24, which is present at first in the gaseous state of aggregation, so that this condenses in the condenser 40 and enters the reactant storage space 20 in the liquid state of aggregation. In order to make it possible to utilize the heat transferred in the heat exchanger to the air L1, the air L1 may be sent, for example, into the interior of the vehicle 10 in order thus to heat the vehicle or to keep it warm.

The filling level of the second reactant 24 in the reactant storage space 20 can be detected by the filling level sensor 34. The actuating device 32 can thus recognize the percentage of the second reactant 24 in the reactant storage space 20, which second reactant is present in the heating system 12, by supplying the signal representing the filling level. If the signal of the filling level sensor 34 indicates that the total quantity or essentially the total quantity of the second reactant 24 present in the heating system 12 is collected in the liquid form in the reactant storage space 20, the actuating device 32 can actuate the connection unit 56 in order to prevent a continued energization of the heat conductor device 54, i.e., to deactivate this. For example, the battery of the vehicle 10, which is also used for the vehicle operation, can continue to be charged in this state. An additional consumption of electrical energy for energizing the heat conductor device 54 can thus be avoided in a state in which essentially only first reactant 22, i.e., calcium oxide in this case, is contained in the reaction space 16, but no more reaction product is basically present. The heating system 12 is then ready again for carrying out a heating operation during a heating phase.

Due to a cyclically repeatable sequence of heating phases and preheating phases, it becomes possible with the heating system 12 described above on the basis of an example for a chemically reacting reaction system to bring the heating system 12 repeatedly into a state suitable for a subsequent vehicle operation, which then makes it possible, by the more prolonged introduction of second reactant 24 into the reaction space 16, to continuously provide and release heat by carrying out the reaction between the first reactant 22 and the second reactant 24 and correspondingly also to heat the air L2 to be introduced into the interior of a vehicle or other system areas of a vehicle. Since no fuel is used at all, but the first reactant 22 and the second reactant 24 can be caused to interact as often as desired to carry out the reaction leading to the reaction product and they can then also be separated from one another accordingly as often as desired by introducing heat, the heating system 12 operates without consumption especially in terms of the fuels used.

Such a thermochemical reaction system may comprise as an alternative first reactant 22 magnesium oxide, which can react with water as a second reactant to form magnesium hydroxide. Barium oxide or strontium oxide may also be used as a first reactant 22.

Calcium chloride hydrate as a first reactant 22 may be reacted with water as a second reactant 24 in another alternative thermochemical reaction system in order to produce in the process calcium chloride dihydrate as the reaction product, which can again be split into its starting compounds, i.e., calcium chloride hydrate and water, by supplying heat.

The configuration and the operation of a heating system according to the present invention for heating a vehicle were described above on the basis of an example for a thermochemical reaction system comprising calcium oxide and water as the reactants and involving a chemical reaction of the two reactants.

An alternative reaction system may be provided, for example, by reactants that react with one another in a thermophysical reaction, for example, by the second reactant being absorbed by the first reactant. Such a reaction system may comprise, for example, zeolite, for example, Zeolite 13X, as the first reactant. The second reactant may be or contain water. The contact of water with zeolite leads, while heat is released, to the absorption of water on zeolite. The heat supply into the reaction product thus provided leads to the desorption of the water in a gaseous state of aggregation. As an alternative to water, ethanol or a water/ethanol mixture or generally a polar liquid may also be used as the second reactant.

In addition to zeolite, for example, hydrophilic zeolite or dealuminated, i.e., hydrophilic zeolite, it is also possible to use, for example, silica gel, activated carbon, for example, in the form of activated carbon molecular sieves, as well as bentonite as alternative first reactants or adsorbents of such thermophysically reacting reaction systems. Organic substances, for example, solvents, may be used as a second reactant 24 especially when dealuminated zeolite (DAY zeolite) is used as the first reactant 22.

In addition to water, especially distilled water, generally alcohol, hydrocarbon or mixtures thereof, carboxylic acids, acid aqueous solutions, alkaline aqueous solutions as well as ammonia-based aqueous solutions may be used as alternative second reactants or adsorptive substances.

While specific embodiments of the invention have been shown and described in detail to illustrate the application of the principles of the invention, it will be understood that the invention may be embodied otherwise without departing from such principles.

What is claimed is:

1. A vehicle heating system comprising:
   a reaction space containing a first reactant;
   a reactant storage space containing a second reactant or/and receiving the second reactant, wherein the first reactant and the second reactant form a reaction system, the reaction system comprising the second reactant reacting chemically or thermophysically with the first reactant, wherein a reaction of the first reactant with the second reactant produces a reaction product that releases heat and wherein the second reactant is separatable from the first reactant by introducing heat into the reaction product;
   a liquid reactant-releasing/introducing device releasing liquid second reactant from the reactant storage space and introducing the liquid second reactant into the reaction space, the liquid reactant-releasing/introducing device comprising a liquid reactant-releasing/introducing line open towards the reaction space and a valve assembly associated with the liquid reactant releasing/introducing line, the valve assembly being switchable between a releasing status releasing a flow of liquid reactant into the reaction space and a blocking status interrupting the flow of liquid reactant into the reaction space;
   a heat removal device for removing heat from the reaction product contained in the reaction space;
   a heating unit for heating the reaction product contained in the reaction space for splitting the reaction product to separate the first reactant from, and to provide the second reactant in, a gaseous state of aggregation; and
   a reactant-recirculating device for recirculating second reactant from the reaction space into the reactant storage space while maintaining the first reactant within the reaction space, the reactant-recirculating device comprising a reactant-recirculating line and a condenser device connected to the reactant-recirculating line for receiving second reactant leaving the reaction space as a gas and for feeding liquid second reactant into the reactant storage space.

2. A vehicle heating system in accordance with claim 1, wherein the condenser device comprises a condenser and a second heat removal device for removing heat from the second reactant received in the condenser.

3. A vehicle heating system in accordance with claim 1, wherein the heating unit comprises an electrically energizable heat conductor device.

4. A vehicle heating system in accordance with claim 3, wherein the heating unit comprises a connection unit for connecting the heat conductor device to a voltage source that is external in relation to a vehicle with the vehicle heating system.

5. A vehicle heating system in accordance with claim 1, wherein the heat removal device comprises a heat carrier medium circuit with a heat exchanger device for transferring heat transported in a heat carrier medium circulating in the heat carrier medium circuit to a medium to be heated.

6. A vehicle heating system in accordance with claim 1, wherein the reaction system comprises the second reactant reacting chemically with the first reactant.

7. A vehicle heating system in accordance with claim 6, wherein, if the reaction system comprises the second reactant reacting chemically with the first reactant, the first reactant is or contains calcium oxide and the second reactant is or contains water.

8. A vehicle heating system in accordance with claim 1, wherein, if
the reaction system comprises the second reactant that reacts thermophysically with the first reactant,
the second reactant is adsorbable by the first reactant.

9. A vehicle heating system in accordance with claim 8, wherein the first reactant is comprised of zeolite and the second reactant comprises water.

10. A vehicle heating system comprising:
a reaction space containing a first reactant;
a reactant storage space containing a second reactant or/and receiving the second reactant, wherein the first reactant and the second reactant form a reaction system wherein a reaction of the first reactant with the second reactant produces a reaction product that releases heat and the second reactant is separatable from the first reactant by introducing heat into the reaction product;
a liquid reactant-releasing/introducing device releasing liquid second reactant from the reactant storage space and introducing the liquid second reactant into the reaction space, the liquid reactant-releasing/introducing device comprising a liquid reactant-releasing/introducing line open towards the reaction space and a valve assembly associated with the liquid reactant releasing/introducing line, the valve assembly being switchable between a releasing status releasing a flow of liquid reactant into the reaction space and a blocking status interrupting the flow of liquid reactant into the reaction space;
a heat removal device for removing heat from the first reactant contained in the reaction space or removing heat from the reaction product contained in the reaction space or removing heat from the first reactant contained in the reaction space and removing heat from the reaction product contained in the reaction space;
a heating unit for heating the first reactant contained in the reaction space or heating the reaction product contained in the reaction space or heating the first reactant contained in the reaction space and heating the reaction product contained in the reaction space; and
a reactant-recirculating device for recirculating second reactant from the reaction space into the reactant storage space.

* * * * *